June 9, 1953     J. H. KRAFT     2,641,545
MANUFACTURE OF SOFT SURFACE CURED CHEESE
Filed April 11, 1951
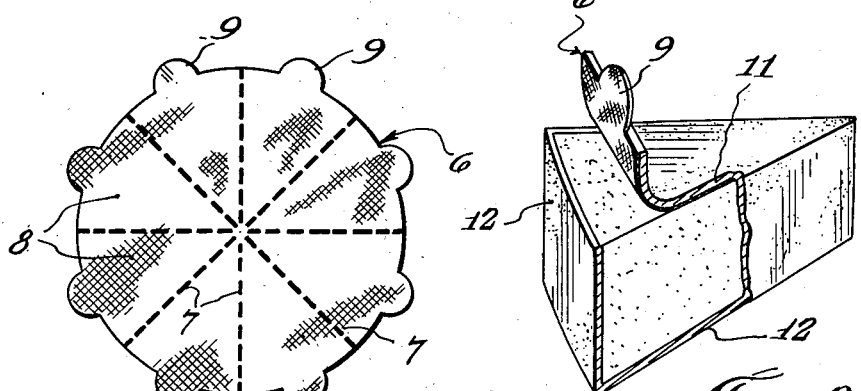
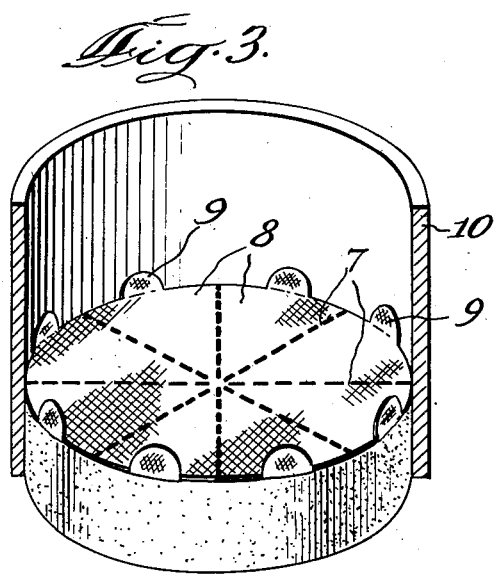
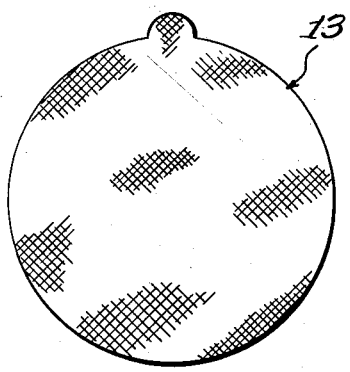
Inventor
John H. Kraft
By Evans Glaister & Anderson
Attorneys Patented June 9, 1953

2,641,545

UNITED STATES PATENT OFFICE 2,641,545

MANUFACTURE OF SOFT SURFACE CURED CHEESE

John H. Kraft, Chicago, Ill., assignor to Kraft Foods Company, Chicago, Ill., a corporation of Delaware Application April 11, 1951, Serial No. 220,489

6 Claims. (Cl. 99—116)

This invention relates in general to the manufacture of soft, surface cured, mold ripened cheeses such as for example, Camembert, Brie, and the like and in particular, to the provision of a soft, surface cured cheese whose mold pad may be readily removed.

Soft, surface cured, mold ripened cheeses, such as Camembert, when well cured, usually comprise a soft interior portion which may be liquid or semi-liquid and which is encased in a mold pad. A few consumers eat both the mold pad and the soft interior portion but many prefer to eat only the soft portion of the cheese. Since the mold pad is usually deformable or plastic and the interior of the cheese is quite fluid, it is quite difficult to cut the pad away from the soft portion of the cheese. In cutting away the pad, portions of the cheese usually oozes out around the pad and adheres to the knife and to the pad. This is naturally of considerable annoyance to the consumer, as well as an ultimate waste of edible cheese.

The separation of the soft interior of surface cured cheese from the exterior pad of such cheese is even more important in the manufacture of pasteurized process cheese. In such manufacture the producer must first remove the pad and place the liquid or semi-liquid interior portion into cooking kettles or pasteurizers. Heretofore, there has not been any satisfactory means of removing the pad from such cheeses except by a time consuming manual separation and even this procedure results in considerable waste. Consequently, the cost of the resulting process cheese is quite high.

Accordingly, the principal object of this invention is the provision of means whereby the mold pad of soft, surface cured, mold ripened cheeses can be readily separated from the soft interior of the cheese. A further object is to provide an improved process of manufacturing soft, surface cured, mold ripened cheese such that the mold pad of the cheese can be quickly and easily removed from the rest of the cheese body. Other objects and advantages of the invention will be made apparent in the following description and in the accompanying drawings showing one preferred embodiment of the invention.

In the drawings:

Figure 1 is a plan view of a loosely woven fabric member adapted for use in the manufacture of soft, surface cured cheese;

Figure 2 is a perspective view partly in section, of a wedge shaped piece of Camembert cheese showing the manner in which the mold pad may be removed from cheese made in accordance with this invention;

Figure 3 is a fragmentary perspective view showing a cheese hoop filled with curd and having a piece of fabric placed in position on the surface of the curd; and Figure 4 is a plan view of a loosely woven fabric member particularly adapted for use in the manufacture of soft, surface cured, mold ripened cheese which is later to be utilized in the manufacture of processed cheese.

Although the present invention is applicable to all types of soft, surface cured, mold ripened cheeses, for convenience the following discussion will be confined to the use of the invention in the manufacture of Camembert cheese, which is one species of soft, surface cured, mold ripened cheese.

A typical Camembert process may include the following steps:

1. Cows' milk which may not or may be pasteurized (usually containing about 3.1 per cent fat) is placed in a vat and warmed to 78–87° F.

2. A culture of *Streptococcus lactis* is added to the milk to develop the acidity required in the manufacture of the cheese.

3. Rennet is then added to the milk (8–10 cc. of rennet to each 100 lbs. of milk) and the mixture is then permitted to stand for a period of from 1.5 to 2 hours to firm the curd.

4. The firmed curd is then cut.

5. The cut curd is dipped into hoops (generally about 4 inches in diameter and about 5 inches high) which are set on porous mats. The curd in the hoop is permitted to drain for from about 2 to 2.5 hours. After that period the hoop is turned over and the curd is permitted to drain for an additional 2 to 2.5 hours.

6. The curd, which by that time has been consolidated into a more or less coherent body is permitted to stand for from 8–10 hours after which it is removed from the hoop and the surfaces of the curd body are then inoculated with *Penicillium camemberti*.

7. The surfaces of the inoculated body of curd are then salted and the body is stored in a high humidity curing room (preferably about 80 per cent relative humidity) maintained at a temperature from about 62–65° F. After about two weeks time the cheese has developed a characteristic mold pad, i. e. the *Penicillium camemberti* mold has grown over the surface of the cheese body.

When making cheese which is to be sold in small pieces, e. g. in wedge shape pieces, the curd body is cut into the desired shape before the curing has progressed to the point where the interior of the cheese has become soft. These cut pieces are then wrapped and the curing of the wrapped pieces is completed by maintaining it under the proper temperature conditions. The cured piece of cheese includes a casing of mold pad which surrounds at least a part of the soft liquid or semi-liquid central portion of the piece cheese.

I have discovered that the mold pad may be readily removed from Camembert cheese if a strip of porous fabric is disposed between the soft body of the cheese and the mold pad. The fabric can then be pulled from the cheese, carrying with it all of the mold pad.

In practicing the present invention, the Camembert process as outlined above, may be followed up to the point where the curd is dipped into the hoop and is consolidated into a body. At this point one or more of the surfaces of the curd body which has been initially consolidated but which has preferably not been completely drained of whey is covered with a layer of porous, loosely woven fabric. This fabric is then pressed into the surface of the cheese so that it becomes thoroughly wetted with whey. The draining of the curd body is then completed and the surface of the body of curd is inoculated and salted in the usual manner, these operations being carried out without disturbing the fabric which is embedded in the surface of the curd.

It has been found that the mold grows over and around the fabric during the curing period and that the fabric becomes embedded in the mold pad in such a manner that the removal of the fabric effects the removal of the mold pad from the surface which is covered by the fabric. (See Fig. 2.)

One preferred form of the porous fabric which can be used particularly in the manufacture of wedge shape portions of Camembert cheese is shown in Fig. 1. The fabric employed is preferably gauze of about 20 mesh but other lightweight porous fabrics such as sterile tobacco cloth, netting or the like, may be used. The fabric is preferably cut into a generally circular disk 6 which is of substantially the same diameter as the diameter hoop in which the curd is drained. The fabric disk 6 is scored along radially extending lines 7 so that the fabric surface is divided into wedge shape sections 8 which correspond to top areas of the pieces which are to be eventually cut from the cheese. For making the fabric accessible after it has been embedded in the rind of the cheese a tab 9 is formed on the arcuate edge of each of the sections.

After the curd has been placed in the hoop, but preferably before all of the whey has been drained therefrom, the circular disk of fabric 6 is placed on top of the curd as shown in Fig. 3 (a fragmentary portion of the hoop is shown in this figure and is indicated as 10). The fabric disk 6 is pressed into the curd surface so that some of the curd penetrates the porous weave of the fabric and the fabric is saturated with whey. The draining of the curd is completed and the curd and embedded fabric are then removed from the hoop as a unit and the surfaces of the curd, including the surface having fabric embedded therein, are inoculated with the *Penicillium camemberti* culture and salted in the usual manner. After a few days of curing under the usual curing conditions the cheese may be cut along the score lines 7 to produce wedge shape portions of the type shown in Fig. 2. These portions may then be wrapped in paper whereupon the curing is completed.

When the cheese is ready for consumption, the tab 9 is pulled upwardly as shown in Fig. 2, to remove the fabric section 8 and the layer of mold 11 (Fig. 2) which has formed over and around the fabric. This exposes the soft central portion of the cheese so that it can be readily consumed. The piece of cheese shown in Fig. 2 only has one surface provided with a fabric layer for mold removal, but it will be apparent that the fabric may be similarly disposed in the mold which surrounds the other surfaces of the cheese (indicated as 12 in Fig. 2). It has been found that only a small amount of the soft central portion of the cheese adheres to the fabric and this adhering material may be readily scraped from the fabric without danger of incorporating mold into the cheese.

In the manufacturing of process or pasteurized Camembert cheese only the soft interior portions of the cheese is cooked and packaged. When the cheese is made for processing it is unnecessary to employ a scored disk 6, but instead the disk may be made from a solid piece of fabric such as the piece 13 illustrated in Fig. 4. This fabric, after curing, may be readily removed to expose the entire interior section of a much larger piece of cheese. Of course, if the cheese is made in a shape other than the traditional round shape, the fabric would be properly proportioned to correspond to the shape of the cheese.

Although the procedure which has been described above relates to the manufacture of Camembert cheese, it should be understood that the invention can be applied to all other types of soft, surface cured cheese. Various of the features of the invention which are believed to be new are set forth in the appended claims.

I claim:

1. As an article of manufacture, a soft, surface cured, mold ripened cheese encased in a mold pad and having a soft interior portion and which includes a porous fabric lying at the interface between said mold pad and said soft interior portion.

2. As an article of manufacture, a soft, surface cured, mold ripened cheese encased in a mold pad and having a soft interior portion and which includes a porous fabric lying at the interface between said mold pad and said soft interior layer and means on said fabric extending out of said mold pad for lifting said fabric from the soft interior portion of said cheese.

3. As an article of manufacture, a soft, surface cured cheese having a mold pad which surrounds a soft interior portion and which includes a porous fabric lying at the interface between said mold pad and said interior portion, said fabric having an integral extended tab which lies exterior of the cheese body for lifting the fabric and mold pad from the soft interior portion.

4. Camembert cheese which has a soft interior portion covered by a mold pad and which includes a porous fabric lying at the interface between said mold pad and said soft interior portion.

5. The process of making soft, surface cured cheese which includes the step of placing a porous fabric on the surface of the curd prior to the step of inoculating the surface of the curd with the curing organism, and curing the cheese with the porous fabric in continuous contact with the curd during curing whereupon a mold pad develops on the porous fabric so that in the resultant cheese the fabric lies at the interface between the mold pad and the soft interior portion of the cheese.

6. The process of making soft, surface cured cheese which includes the steps of placing a porous fabric on the surface of the curd after the curd has been consolidated, retaining the porous fabric in place during curing, and prior to the time that all of the whey has been drained from the curd outwardly of the fabric, inoculating the surface of said curd, said inoculation causing mold formation over the surface of the curd and fabric whereby in the resultant cheese body the fabric lies between the mold and the soft interior portion of the cheese.

JOHN H. KRAFT.

References Cited in the file of this patent

UNITED STATES PATENTS

| Number | Name | Date |
|---|---|---|
| 1,183,986 | Jovignot | May 23, 1916 |
| 1,547,903 | Cole | July 28, 1925 |

FOREIGN PATENTS

| Number | Country | Date |
|---|---|---|
| 257,336 | Great Britain | Aug. 30, 1926 |

OTHER REFERENCES

Storrs Agricultural Experiment Station Bulletin No. 46, February 1907, pages 67, 68, 69, 70, 71 and 72.

U. S. Dept. of Agriculture Dept. Bulletin No 1171, pub. by Superintendent of Documents, Govt. Printing Office, Wash., D. C., Aug. 30, 1923, pages 10, 11, 14, 15, 20, 21, 23 and 24.